United States Patent [19]

Richard

[11] Patent Number: 5,091,211
[45] Date of Patent: Feb. 25, 1992

[54] COATING METHOD UTILIZING PHOSPHORIC ACID ESTERS

[75] Inventor: Lawrence D. Richard, Erie, Pa.

[73] Assignee: Lord Corporation, Erie, Pa.

[21] Appl. No.: 395,385

[22] Filed: Aug. 17, 1989

[51] Int. Cl.$^5$ .......................... B05D 3/06; B32B 27/40
[52] U.S. Cl. .................................. 427/44; 427/393.5; 428/424.6; 428/424.4
[58] Field of Search ............... 427/44, 393.5; 528/393; 428/424.6, 424.4

[56] References Cited

U.S. PATENT DOCUMENTS

| | | | |
|---|---|---|---|
| 3,867,351 | 2/1975 | Juna et al. | 427/44 |
| 3,909,379 | 9/1975 | Gotoda et al. | 526/278 |
| 3,936,403 | 2/1976 | Sakaguchi et al. | 524/321 |
| 3,984,500 | 10/1976 | Dickie et al. | 525/287 |
| 3,987,127 | 10/1976 | Dickie et al. | 525/287 |
| 4,000,349 | 12/1976 | Dickie et al. | 428/461 |
| 4,233,074 | 11/1980 | Dodwell et al. | 427/175 |
| 4,264,643 | 4/1981 | Granata et al. | 427/44 |
| 4,322,330 | 3/1982 | Merz et al. | 525/107 |
| 4,333,987 | 6/1982 | Kwart et al. | 428/419 |
| 4,337,296 | 6/1982 | Varadhachary | 428/420 |
| 4,393,187 | 7/1983 | Boba et al. | 427/54.1 |
| 4,424,252 | 1/1984 | Nativi | 428/209 |
| 4,631,235 | 12/1986 | Biale | 427/518 |
| 4,730,021 | 3/1988 | Zom et al. | 525/278 |
| 4,738,870 | 4/1988 | Green et al. | 427/54.1 |
| 4,743,631 | 5/1988 | Greco et al. | 522/107 |

OTHER PUBLICATIONS

Bill L. Brann, "Factors Affecting Adhesion in Radiation Curable Coatings," 4/86, Journal of Radiation Curing, pp. 12-16.

Primary Examiner—Michael Lusignan
Assistant Examiner—Diana L. Dudash

[57] ABSTRACT

In a method of coating a vinyl resin layer with a coating composition comprising a radiation-curable acrylourethane, a photoinitiator and at least one unsaturated addition-polymerizable monomer polymerizable with said acrylourethane and radiation-curing the coated vinyl resin layer to form a bond, the improvement comprising including in said coating composition a monoester or diester of phosphoric acid in an amount sufficient to improve the strength of said bond.

12 Claims, No Drawings

COATING METHOD UTILIZING PHOSPHORIC ACID ESTERS

FIELD OF THE INVENTION

This invention relates to a method for improving the adhesion between vinyl resin layers such as are used as the wear layer on vinyl floor and wall tile and acrylate urethane topcoats. The invention is also directed to improved products obtained by this method.

BACKGROUND OF THE INVENTION

In the manufacture of vinyl floor and wall coverings or tiles, normally a flat base layer or substrate, customarily a felted or matted fibrous sheet, is coated with a vinyl resinous composition which usually contains a foaming agent. The vinyl resin coated base or substrate is then gelled by thermal treatment and may be printed with a decorative pattern. The surface resulting vinyl resin coated base is provided with yet another vinyl resin layer commonly referred to as a vinyl resin wear layer.

An alternative method of vinyl floor covering manufacture involves forming into sheet form mixtures of a vinyl resin such as vinyl chloride polymer, filler and plasticizer.

In both instances, it is frequently desired to provide the vinyl floor covering or vinyl resin wear layer with an acrylated urethane top-coat since it is known to possess highly desirable physical and chemical protective characteristics. Unfortunately, it has been found that in many instances the bond between the vinyl resin layer and the acrylated polyurethane is not as strong or as permanent as desired.

It is an object of the invention to provide a method whereby the adhesive strength of the bond between the acrylated polyurethane resin and the vinyl resin layer is significantly improved.

It is also an object of the invention to provide vinyl floor covering coated with acrylated polyurethane composition exhibiting improved adhesion at the interface of the cured acrylated polyurethane coating layer and the vinyl resin layer.

SUMMARY OF THE INVENTION

In a method of coating a vinyl resin layer with a coating composition comprising a radiation-curable acrylourethane, a photoinitiator and an addition-polymerizable monomer polymerizable with said acrylourethane and radiation curing the coated vinyl resin layer, it has been found that an improvement in bond strength can be obtained by including in said coating composition, prior to curing, a sufficient amount of a monoester or diester of phosphoric acid.

A surprising feature of the invention involves the discovery that while the coating compositions of the invention are known to provide strong adhesive bonds to metal substrates, the same coatings have failed to provide bonds of satisfactory strength on synthetic plastic substrates.

In another aspect of the invention, an improved vinyl floor covering is obtained comprising i) a thermoplastic base comprising vinyl chloride polymer, filler and plasticizer and ii) a wear layer bonded to said base, said wear layer comprising a radiation cured coating composition comprised of acrylourethane, photoinitiator and an addition-polymerizable monomer polymerizable with said acrylourethane and a monoester or diester of phosphoric acid in an amount sufficient to improve the bond of the wear layer to the base.

DETAILED DESCRIPTION OF THE INVENTION

Mono- and Diesters of Phosphoric Acid

The phosphoric acid esters of the invention can be any water-soluble monoester or diester of phosphoric acid having the structure:

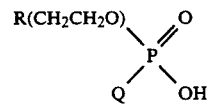

wherein R is a straight or branch chained aliphatic group, a substituted or unsubstituted aromatic group and a straight or branched chain saturated or unsaturated acyl group; Q is HO— or RO(AO)$_n$; where R is 8 to 20 and A is a divalent alkylene group of 2 to 3 carbon atoms which can be unsubstituted or substituted as, for instance, with hydroxyl or hydroxyalkyl groups.

Suitable aliphatic R groups are alkyl groups of 1 to 20 carbon atoms such as methyl, ethyl, propyl, butyl, isobutyl pentyl, hexyl, isohexyl, heptyl, octyl, nonyl and decyl groups; and alkylene groups such as ethenyl; 1-propenyl, isopropenyl, 2-butenyl, 1,3-butadienyl; 3,3-dimethyl-1-butenyl and the like.

Illustrative of aromatic R groups are aryl and alkaryl groups of 6 to 26 carbon atoms such as phenyl, benzyl, styryl, xylyl, ethylphenyl, octylphenyl, nonylphenyl, decylphenyl and the like.

Examples of suitable acyl R groups are saturated acyl groups such as acetyl, propanoyl, butanoyl, pentanoyl, hexanoyl, propenoyl and the like. Preferred unsaturated R groups are acryloyl and methacryloyl groups.

The monoesters and diesters of the invention are well known, commercially available, compounds that can be prepared by reaction of phosphoric acid with non-ionic surfactants of the ethylene oxide-adduct type or with an acrylate or methacrylate. Preferred monoesters and diesters of the first type are mixed monoesters and diesters of phosphoric acid such as polyethylene nonylphenyl ether phosphates commercial available under the mark GAFAC. Representative of acrylated or methacrylated monoesters and diesters of phosphoric acid are 2-methacrylolyloxyethyl phosphate, di(2-methacryloyloxylethyl phosphate, 2-acryloyloxyethyl-phosphate, di(2-acryloyl-oxyethyl phosphate, methyl(2-methacryloyloxethyl) phosphate, ethyl methacryloyloxyethyl phosphate, methyl acryloyloxyethyl phosphate and the like.

The amount of monoester or diester of phosphoric acid included in the coating composition of the invention will vary depending principally upon the particular monoester or diester selected but will always be an effective amount sufficient to improve the bonding strength of the composition. Generally, this amount falls in the range of 0.5 to 10% by weight of the total coating composition.

Acrylate Polyurethane

The radiation curable acrylated polyurethanes are urethane prepolymers or oligomers prepared by reacting an acrylic monomer with an isocyanate functional urethane formed by the reaction of an excess of a polyisocyanate and a polyol selected from the group consisting of polyester, polyether, polyetherester and polycaprolactone polyols.

The term "acrylic monomers" as used herein means an alpha, beta monounsaturated monocarboxylic acid or esters thereof and includes acrylic acid, and alkylacrylic acids, e.g., methacrylic acids, monohydric and polyhydric alcohol esters of acrylic acid and alkylacrylic acids, e.g., glycidyl methacrylate, 2-hydroxyethyl methacrylate, etc.

The isocyanate compounds which are employed in forming the urethane oligomers in accordance with the present invention can be any organic isocyanate compound having at least two free isocyanate groups. Included within the purview of suitable polyisocyanates are aliphatic, cycloaliphatic and aromatic polyisocyanates, as these terms are generally interpreted in the art. Thus, it will be appreciated that any of the known polyisocyanates such as alkyl and alkylene polyisocyanates, cycloalkyl and cycloalkylene polyisocyanates, aryl and arylene polyisocyanates, and combinations such as alkylene, cycloalkylene and alkylene arylene polyisocyanates, can be employed in the practice of the invention.

Suitable polyisocyanates include, without limitation, tolylene-2,4-diisocyanate, 2,2,4-trimethylhexamethylene-1,6-diisocyanate, hexamethylene-1,6-diisocyanate, diphenylmethane-4,4'-diisocyanate, triphenylmethane-4,4',4"-triisocyanate, polymethylene polyphenylisocyanate, m-phenylene disocyanate, p-phenylene diisocyanate, 2,6-tolylene diisocyanate, 1,5-naphthalene diisocyanate, naphthalene-1,4-diisocyanate, diphenylene-4,4'-diisocyanate, 1,4-cyclohexylene dimethylene diisocyanate, xylylene-1,4-diisocyanate, xylylene-1,3-diisocyanate, cyclohexyl-1,4-diisocyanate, 4,4'-methylene-bis-(cyclohexyl isocyanate), 3,3'-dimethyldiphenylmethane-4,4'-diisocyanate, isophorone diisocyanate, the product obtained by reacting trimethylol propane and 2,4-tolylene diisocyanate in a ratio of 1:3 and the like. The diisocyanate compounds are preferred, with 4,4'-methylene-bis(cyclohexyl isocyanate) being especially preferred.

The polyester, polyether, polyetherester and polycaprolactone polyols used to form the isocyanate functional methanes are also well known in the art.

The polyether glycols are commonly referred to as poly (alkylene oxide) polyols or polyalkylene ether glycols. They may be represented by the formula HO(-RO)$_n$H, in which R is an alkylene radical and n is at least 2. The alkylene radical can be a single chain or can consist of two or more alkylene chains separated from each other by an ether oxygen atom. Preferred poly(alkylene oxide) polyols have from 1 to 9, preferably 1 to 6 carbon atoms in the alkylene chain separating each pair of oxygen atoms and have a number average molecular weight in the range from about 106 to about 4000, preferably about 106 to about 2500. Representative poly(alkylene oxide) polyols include poly(ethylene oxide) polyols, poly(propylene oxide) polyols, poly(tetramethylene oxide) polyols, poly(nonamethylene oxide) polyols, poly(oxymethylene-ethylene oxide) polyols, poly(ethylene oxide-propylene oxide copolymer) polyols, and poly(pentaerythritol-ethylene oxide) polyols. Thus, the poly(alkylene oxide) polyols will generally have from 2 to 6 hydroxyl groups, with such polyols having 2 hydroxyl groups being currently preferred. Preferred poly(alkylene oxide) polyols are poly(tetramethylene oxide) polyols, poly(propylene oxide) polyols, poly(ethylene oxide-propylene oxide) polyols, and poly(ethylene oxide) polyols, with the latter being especially preferred.

The polyester glycols are condensation polymers of an excess of a polyol such as a diol, triol and the like and an aliphatic, cycloaliphatic and aromatic acids having at least two carboxyl groups and including anhydrides of such acids.

Polycarboxylic acids which may be employed in forming the polyester polyols which are suitable for use in the present invention consist primarily of monomeric carboxylic acids having at least two carboxyl grops or their anhydrides having from 2 to 14 carbon atoms per molecule, with dicarboxylic acids or their anhydrides being currently preferred. Among such useful acids are phthalic acid, isophthalic acid, terephthalic acid, tetrahydrophthalic acid, hexhydrophthalic acid, adipic acid, sebacic acid, maleic acid, glutaric acid, chlorendic acid, tetrachlorophthalic acid, itaconcic acid, trimellitic acid, tricarballylic acid, and other known polycarboxylic acids of varying types. It is currently preferred that the polyester include an aliphatic dicarboxylic acid as at least part of the acid component. Illustrative of suitable polyester polyols are poly(tetramethylene adipate) diol; poly(ethylene succinate) diol; poly(1,3-butylene sebacate) diol; poly(hexylene phthalate) diol; 1,3-butylene glycol/glycerine/adipic acid/isophthalic acid) diols and triols and the like.

Similarly, the polycaprolactone polyols are esterification polymers of polycaprolactone diols and triols with polycarboxylic acids such as discussed above.

Polyetherester polyols may be prepared by conventional esterification techniques employing conventional apparatus. Esterification is generally effected in the presence of an inert atmosphere such as nitrogen. The poly(alkylene oxide) polyol and non(polyalkylene oxide) polyol monomeric and polymeric materials are mixed in a suitable reactor and heated with agitation to a temperature from 60° C. to 100° C. or higher. The acid components are then added and heating with agitation is continued at a temperature and rate such that the water of esterification can be rapidly removed, generally by distillation. The esterification reaction is continued until the acid number is 10 or less and substantially all of the water of esterification and low-boiling impurities are removed.

Unsaturated Addition-Polymerizable Monomer

The unsaturated addition-polymerizable monomers polymerizable with the acrylated urethanes by exposure to radiation are commonly referred to as reactive diluent systems which can be monofunctional or polyfunctional or combinations thereof. Such combinations of mono- and polyfunctional reactive diluents are presently preferred. Generally, the reactive diluent system will comprise from about 10 to about 65, preferably about 25 to about 50, weight percent, based on total weight of unsaturated urethane resin and reactive diluent, of the radiation curable compositions of the invention. Particularly preferred reactive diluents are unsaturated addition-polymerizable monofunctional monomeric compounds selected from the group consisting of esters having the general formula:

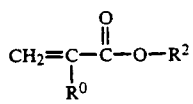

wherein $R^0$ is hydrogen or methyl and $R^2$ is an aliphatic or cycloaliphatic, preferably alkyl or cycloalkyl group having 6 to 18, preferably 6 to 9 carbon atoms. Representative of such preferred reactive monomeric diluents, without limitation thereto, are hexyl acrylate, cyclohexyl acrylate, 2-ethylhexyl acrylate, octyl acrylate, nonyl acrylate, stearyl acrylate, and the corresponding methacrylates. Illustrative of other reactive monofunctional and polyfunctional monomeric diluents which can be employed are styrene, lactone modified esters of acrylic and methacrylic acid, methyl methacrylate, butyl acrylate, isobutyl acrylate, 2-phenoxy acrylate, 2-methoxyethyl acrylate, 2-(N,N-diethylamino)ethyl acrylate, the corresponding methacrylates, acrylonitrile, methyl acrylonitrile, methacrylamide, neopentyl glycol diacrylate, ethylene glycol diacrylate, hexylene glycol diacrylate, and diethylene glycol diacrylate.

Photoinitiator

The photoinitiator may be selected from a large group of known initiators of which the following are illustrative: benzophenone, benzoin, acetophenone, benzoin methyl ether, Michler's ketone, benzoin butyl ether, xanthone, thioxanthone, propiophenone, fluorenone, carbazole, diethoxyacetophenone, the 2-, 3- and 4-methylacetophenones and methoxyacetophenones, the 2- and 3-chloroxanthones and chlorothioxanthones, 2-acetyl-4-methylphenyl acetate, 2,2'-dimethoxy-2-phenylacetophenone, benzaldehyde, fluorene, anthroquinone, triphenylamine, 3- and 4-allylacetophenone, p-diacetylbenzene, 3-chloro-2nonylxanthone, and the like and mixture thereof. Such photoinitiators are used in amount of from about 0.5 to about 20% by weight, preferably from about 1% to about 5% by weight based on the total weight of the coating composition.

The coating compositions can also include pigments, fillers, wetting agents, flatting agents, flow control agents, and other additives typically present in coating compositions. In some applications, the inclusion of minor amounts of inert solvents can be advantageous. Such additive materials are well known to those skilled in the art and do not require further elaboration herein. Also well known are the concentrations at which such additives are used.

Vinyl Resin Layer

The vinyl resin layer onto which the coating composition can be applied can be any foamable or non-foamable vinyl resin composition known in the art. Often the vinyl resin composition is a dispersion of resin in a liquid medium. The dispersion medium can be water in the case of an aqueous latex, organic solvent as an organosol or plasticizer as a plastisol. The formulation of such vinyl resin laxtices, organosols and plastisols is well known in the art.

Thus, the vinyl resin layer can be in the form of a vinyl floor or wall tile comprised of a mixture of vinyl resin, filler, plasticizer and usually pigment and heat stabilizers blended and formed into sheets by conventional milling and calendaring methods.

The preferred and most widely used resin for surface coverings are polymers of vinyl chloride. The vinyl chloride polymers can either be simple, unmixed homopolymers of vinyl chloride or copolymers, terpolymers or the like in which the essential polymeric structure of polyvinyl chloride is interspersed at intervals with the residue of other ethylenically unsaturated compounds polymerized therewith. The essential properties of the polymeric structure of polyvinyl chloride will be retained if not more than about 40 percent of the extraneous copolymer is copolymerized therein. Suitable extraneous comonomers include, for instance, vinyl bromide, vinyl fluoride, vinyl esters, vinyl ethers, cyclic unsaturated compounds such as styrene, acrylic acid and its derivatives, unsaturated hydrocarbons such as ethylene, propylene, isobutene and the like; allyl compounds such as allyl acetate, allyl chloride, allyl ethyl ether and the like; and conjugated and cross-conjugated ethylenically unsaturated compounds such as butadiene, isoprene, chloroprene, 2,3-dimethylbutadiene, 1,3-piperylene, divinyl ketone and the like.

The vinyl resin layers can be utilized per se but are frequently supported on a base layer or substrate prior to being coated with the coating composition. Such substrates are customarily felted or matted fibrous sheets of overlapping, intermingled fibers, although many other forms of sheets, films, or fabrics and many other fibers of natural or synthetic origin have been used.

Thus, the vinyl resin layer of the invention may take the form of vinyl polymer sheet material, especially vinyl floor and wall coverings, including resilient foamed embossed vinyl sheets.

Coating and Curing Coated Vinyl Resin Layer

The coating composition can be applied to the vinyl resin layer by any of the known methods as, for instance, roll coating, gravure coating, curtain coating and the like. The viscosity of the coating composition is first advantageously adjusted as by the addition of a suitable diol so as to render it spreadable by the coating means adopted.

Curing conditions for the radiation curable acrylated polyurethanes differ from those employed for more conventional polyurethanes in that such acrylated polyurethanes are cured by being passed through an actinic radiation source such as an ultraviolet lamping unit. Radiation curing by electron beam, gamma and x-ray treatment, and other suitable radiation sources may be employed but must be used at relatively low energy levels, inasmuch as they are essentially examples of very high energy irradiation techniques leading to extremely rapid polymerization. Ultraviolet radiation is the preferred and typical source. In the presence of photoinitiators, such radiation sources induce a photochemical reaction which produces free radicals capable of inducing polymerization. Sources of ultraviolet radiation may be mercury vapor arc lamps, plasma arcs, pulsed xenon lamps and carbon arcs. Mercury vapor arc lamps are preferred and typical, preferably at medium pressure, rather than high pressure or low pressure. Specific wavelengths of light which are most effective will vary, depending primarily upon the particular polyurethane top surface coating formulation used and the particular photosensitizer employed. It is also to be appreciated that in some instances, combinations of thermal curing and radiation curing conditions may be used.

The present invention will be further described with particular reference to the following specific working examples, wherein there are disclosed preferred and typical embodiments of the present invention. However, it is to be pointed out that such specific examples are primarily illustrative and not limitative of the broader principles of the inventive concept and that other specific materials, chemicals processed, etc. may be employed without departing from the scope and the spirit of the appended claims.

In the Examples, the degree of adhesion of the coating composition to the substrate was measured by the Crosshatch Test. The Crosshatch Test involves the following procedure:

1. Make sure coating is fully cured before testing.
2. Keeping the blade perpendicular to the substrate, cut six parallel lines about ⅛" apart using a razor blade. Cut a second set at right angles to the first set. Total number of squares is 25.
3. A strip 3½" to 4" of 3M #250 tape is centered over the block of squares parallel to one set of scribe lines.
4. Rub tape with tongue depressor to ensure maximum contact of tape with substrate. Use moderate pressure to laminate the tape.
5. Remove tape with one quick pull, pulling it off as close to an angle of 180° as possible.
6. Repeat steps 3, 4 and 5 on the same area two more times.
7. Record the percentage of squares removed by each of three pulls. (Example: 5%, 10% and 20%.)

EXAMPLE 1

A commercial polyvinyl chloride wearlayer was coated with a 0.0015 uniform inch layer of the coating formulations identified in Table 1 below. The coated wear layers were cured by exposure under a nitrogen atmosphere to ultraviolet radiation employing an intensity of 200 watts per inch at a line speed of 20 ft/min. The thus coated substrates were subjected to the Crosshatch Adhesion Test. The results of the test are also reported in Table 1.

TABLE 1

|  | A | B | C | D | E | F |
|---|---|---|---|---|---|---|
| Acrylated Oligomer Resin (1) | 48.0 | 48.0 | 48.0 | 48.0 | 48.0 | 48.0 |
| Mixture of Acrylated Monomers (2) | 50.0 | 49.9 | 49.5 | 49.0 | 48.0 | 45.0 |
| Photoinitiator (3) | 2.0 | 2.0 | 2.0 | 2.0 | 2.0 | 2.0 |
| Phosphate Ester (4) | — | 0.1 | 0.5 | 1.0 | 2.0 | 5.0 |
|  | 100.0 | 100.0 | 100.0 | 100.0 | 100.0 | 100.0 |
| Crosshatch Adhesion | Fail | Fail | Fail | Pass | Pass | Pass |

(1) Reaction product of Desmodur W isocyanate and RUCO polyester polyol having an average molecular weight of 650 wherein any excess isocyanate is capped with hydroxyalkyl acrylate.
(2) Mixture is blend of the following 3 acrylated monomers: SR 9003 and SR 454 commercially available from Sartomer and vinyl pyrrolidone commercially available from GAF Corporation.
(3) Acctocure X500 (product of Ciba-Geigy).
(4) GAFAC RE610 (polyethylene nonylphenyl ether phosphate) a product of GAF Corporation.

EXAMPLE II

Example I was repeated but using as the coating formulations those identified in Table 2 below. The test results are reported in Table 2.

TABLE 2

|  | A | B | C | D | E | F |
|---|---|---|---|---|---|---|
| Acrylated Oligomer Resin (1) | 31.7 | 31.7 | 31.7 | 31.7 | 31.7 | 31.7 |
| Mixture of Acrylated Monomers (2) | 67.0 | 66.5 | 66.3 | 66.0 | 65.5 | 65.0 |
| Photoinitiator (3) | 1.3 | 1.3 | 1.3 | 1.3 | 1.3 | 1.3 |
| Phosphate Ester (4) | — | 0.5 | 0.7 | 1.0 | 1.5 | 2.0 |
|  | 100.0 | 100.0 | 100.0 | 100.0 | 100.0 | 100.0 |
| Crosshatch Adhesion | Fail | Fail | Pass | Pass | Pass | Pass |

(1) Reaction product of Desmodur W isocyanate and RUCO polyester polyol having an average molecular weight of 650 wherein any excess isocyanate is capped with hydroxyalkyl acrylate.
(2) Mixture is blend of the following 3 acrylated monomers: SR 9003 and SR 454 commercially available from Sartomer and vinyl pyrrolidone commercially available from GAF Corporation.
(3) Acctocure X500 (product of Ciba-Geigy).
(4) GAFAC BH650 (polyethylene alkyl ether phosphate) a product of GAF Corporation.

EXAMPLE III

Example I was repeated but using as the coating formulations those identified in Table 3 below. The results are reported in Table 3.

TABLE 3

|  | G |
|---|---|
| Acrylated Oligomer Resin (1) | 31.7 |
| Acrylated Monomer (2) | 66.3 |
| Photoinitiator (3) | 1.3 |
| Acrylated Phosphate Ester (5) | 0.7 |
|  | 100.0 |
| Crosshatch Adhesion | Pass |

(5) Ebecryl 170 a product of Radcure Specialities Corporation

The results of Tables 1, 2 and 3 demonstrate the improved effects on adhesion of including in the coating composition small effective amounts of the phosphate ester of the invention.

It is claimed:

1. In a method of coating a vinyl resin layer with a coating composition comprising a radiation-curable acrylourethane, a photoinitiator and at least one unsaturated addition-polymerizable monomer polymerizable with said acrylourethane and radiation-curing the coated vinyl resin layer to form a bond with the coating composition, the improvement comprising including in said coating composition a monoester or diester of phosphoric acid in an amount sufficient to improve the strength of said bond.

2. A method according to claim 1 wherein the phosphoric acid ester has the structure:

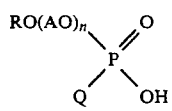

wherein Q is —OH or RO(CH$_2$CH$_2$O)$_n$—; n is 1 to 100; A is a divalent alkylene of 2 to 3 carbon atoms; and R is an aliphatic, aromatic or acyl group.

3. A method according to claim 2 wherein R is an alkyl or 8 to 20 carbon atoms.

4. A method according to claim 2 wherein R is an alkaryl group of 8 to 14 carbon atoms.

5. A method according to claim 2 wherein R is an unsaturated aliphatic group of 4 to 20 carbon atoms.

6. A method according to claim 1 wherein R is an acyl group of 8 to 20 carbon atoms.

7. A method according to claim 6 wherein the organophosphate ester has the structure:

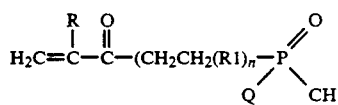

wherein R is H, Cl or CH$_3$; R$_1$ is O or

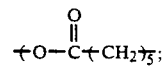

Q is OH or

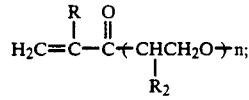

n is 1 to 6; and R$_2$=H$_2$ or CH$_3$

8. A method according to claim 1 wherein the organophosphate ester is added in an amount of about 0.5 to 10% by weight.

9. A method according to claim 1 wherein the amount of phosphoric acid ester is 0.5 to 5% by weight.

10. A method according to claim 1 wherein the vinyl resin layer is a vinyl chloride polymer resin and the photoinitiator is benzophenone.

11. A coated vinyl resin layer comprising i) a vinyl resin layer and ii) a wear layer bonded to said resin layer, said wear layer comprising a radiation cured coating composition comprised of acrylourethane, photoinitiator and an addition-polymerizable monomer polymerizable with said acrylourethane and a monoester or diester of phosphoric acid in an amount sufficient to bond the wear layer to the resin layer.

12. A coated vinyl resin layer according to claim 11 wherein the vinyl resin layer is a thermoplastic base floor covering comprising vinyl chloride polymer, filler, and plasticizer.

* * * * *